(12) United States Patent
Weber et al.

(10) Patent No.: US 6,735,645 B1
(45) Date of Patent: May 11, 2004

(54) SYSTEM AND METHOD TO ELIMINATE RACE CONDITIONS IN INPUT/OUTPUT OPERATIONS FOR HIGH BANDWIDTH ARCHITECTURES

(75) Inventors: Bret S. Weber, Wichita, KS (US);
Russell J. Henry, Wichita, KS (US);
Dennis E. Gates, Wichita, KS (US);
Keith W. Holt, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 276 days.

(21) Appl. No.: 09/946,000

(22) Filed: Sep. 4, 2001

(51) Int. Cl.⁷ ................................................ G06F 13/14
(52) U.S. Cl. .......................... 710/35; 710/22; 710/25; 711/112; 711/114; 370/231; 370/352
(58) Field of Search ............................ 370/35, 22, 231, 370/352, 235; 711/114, 112

(56) References Cited

U.S. PATENT DOCUMENTS 5,566,304 A * 10/1996 Regal .......................... 395/285
6,298,041 B1 * 10/2001 Packer ........................ 370/231
6,600,737 B1 * 7/2003 Lai et al. .................... 370/352

\* cited by examiner

*Primary Examiner*—A. Elamin
(74) *Attorney, Agent, or Firm*—Suiter West PC LLO

(57) ABSTRACT

The present invention is directed to a system and method for eliminating race conditions in RAID controllers while utilizing a high bandwidth internal architecture for data flow. A remote memory controller of the present invention may ensure that an acknowledge signal is sent only after a memory operation has been actually completed. This may provide for remote direct memory access without coherency problems and data corruption problems while a high bandwidth data flow internal architecture is being utilized.

15 Claims, 5 Drawing Sheets

SYSTEM AND METHOD TO ELIMINATE RACE CONDITIONS IN INPUT/OUTPUT OPERATIONS FOR HIGH BANDWIDTH ARCHITECTURES

FIELD OF THE INVENTION

The present invention relates generally to network storage systems and memory controller architecture and more specifically to a method and system to eliminate race conditions in memory controller architectures.

BACKGROUND OF THE INVENTION

The utilization and expansion of computer technology has increased the necessity of inexpensive and reliable data storage. One example of inexpensive and reliable data storage is the Redundant Array of Inexpensive Disks (RAID) system. RAID implementations enhance the reliability and integrity of data storage through the redundant writing of data across a given number of physical disks.

In the past, peripheral component interconnect (PCI) internal busses were utilized for RAID array controllers. PCI busses perfomed well in that they could operate without creating memory race conditions by producing an immediate write operation that could be completed in a short period of time. However, the utilization of PCI busses is accompanied by a limited amount of bandwidth and difficulty in expansion. Other types of internal architectures are now being utilized to transport data between processors and input/output devices such as INFINIBAND which allow greater bandwidth and easier expansion. A problem with internal architectures other than PCI for RAID controllers is race conditions whereby undesirable results may occur due to the critical dependence on the relative timing of events.

SUMMARY OF THE INVENTION

Accordingly, the present invention is directed to a system and method for eliminating race conditions in RAID controllers while utilizing a high bandwidth internal architecture for data flow. In one embodiment of the invention, a system of the present invention may include a memory controller which may delay an acknowledgment to a requester until the resulting memory operation has been completed. In another embodiment of the invention, a method of the present invention may provide remote direct memory access without coherency problems and data corruption problems while a high bandwidth data flow internal architecture is being utilized.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to an embodiment of the invention, examples of which are illustrated in the accompanying drawings.

A storage system 100 in which multiple individual hard disks may be accessed as if the array of multiple disks were a single larger disk is shown. System 100 may be representative of a RAID system for data storage and accessability. Network storage systems such as system 100 are typically utilized to provide for reliable and secure mass storage of data. An advantageous aspect of the system 100 is the ability to improve access time and reduces the risk of losing data if a drive fails.

System 100 may include an array controller 110 and multiple disks 120–128. Data may be delivered from a data repository 105 such as a server or personal computer which are operatively connected to array controller 110. System 100 may utilize various types internal architectures in order to provide redundancy and improved access rates including peripheral component interconnect (PCI), rapid input output (RIO), hypertransport, and INFINIBAND. PCI has been widely utilized as the internal architecture for storage systems such as RAID storage systems, however, PCI busses have limited bandwidth. A problem with other types of fabric-based architectures, such as INFINIBAND, that may provide improved bandwidth is the creation of race conditions whereby undesirable results may occur due to the critical dependence on the relative timing of events. For example, race conditions may cause coherency problems and data corruption problems within the storage system.

Figure 1:
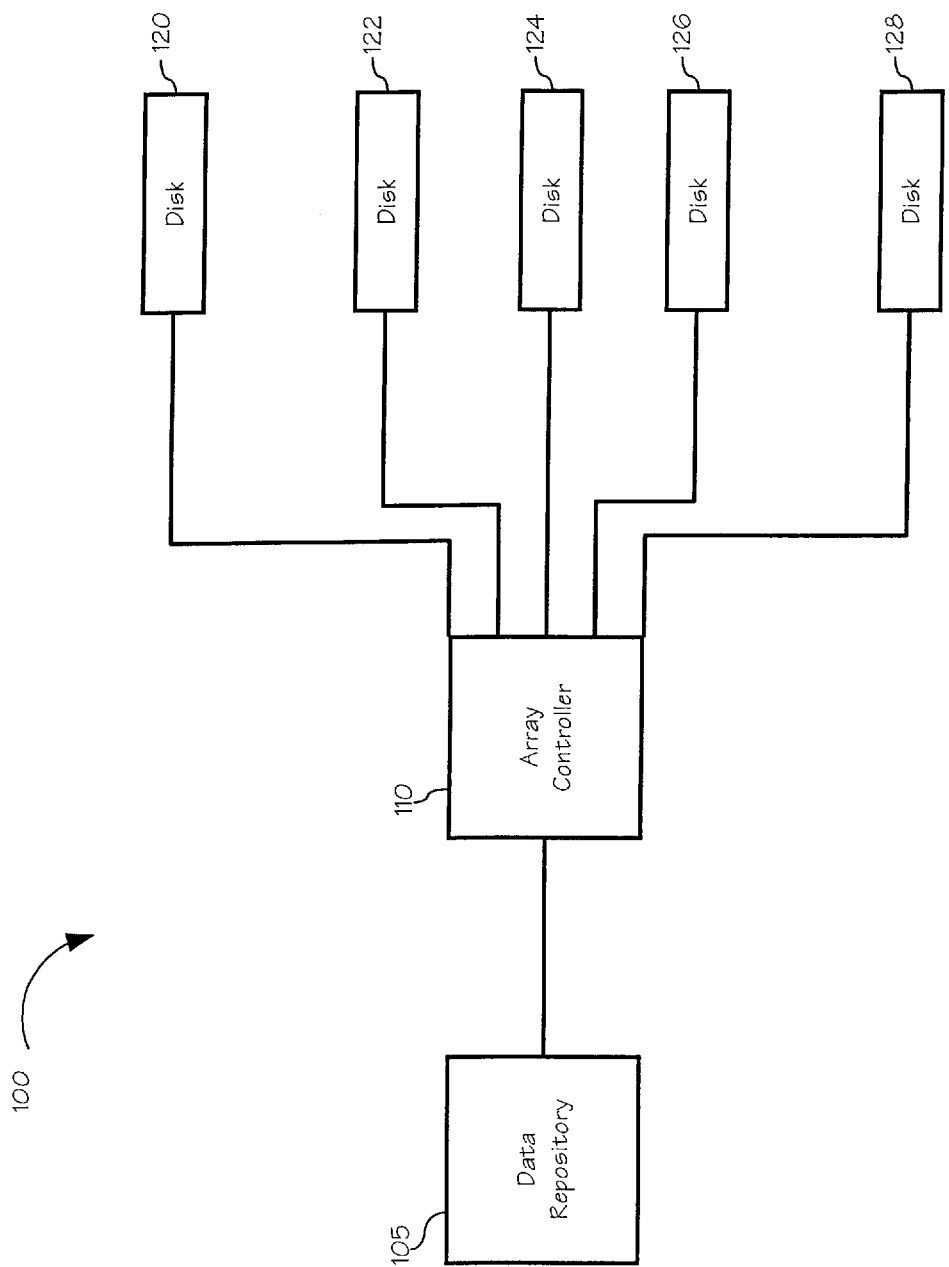
FIG. 1 depicts an embodiment of a storage system known to the art.
Figure 2:
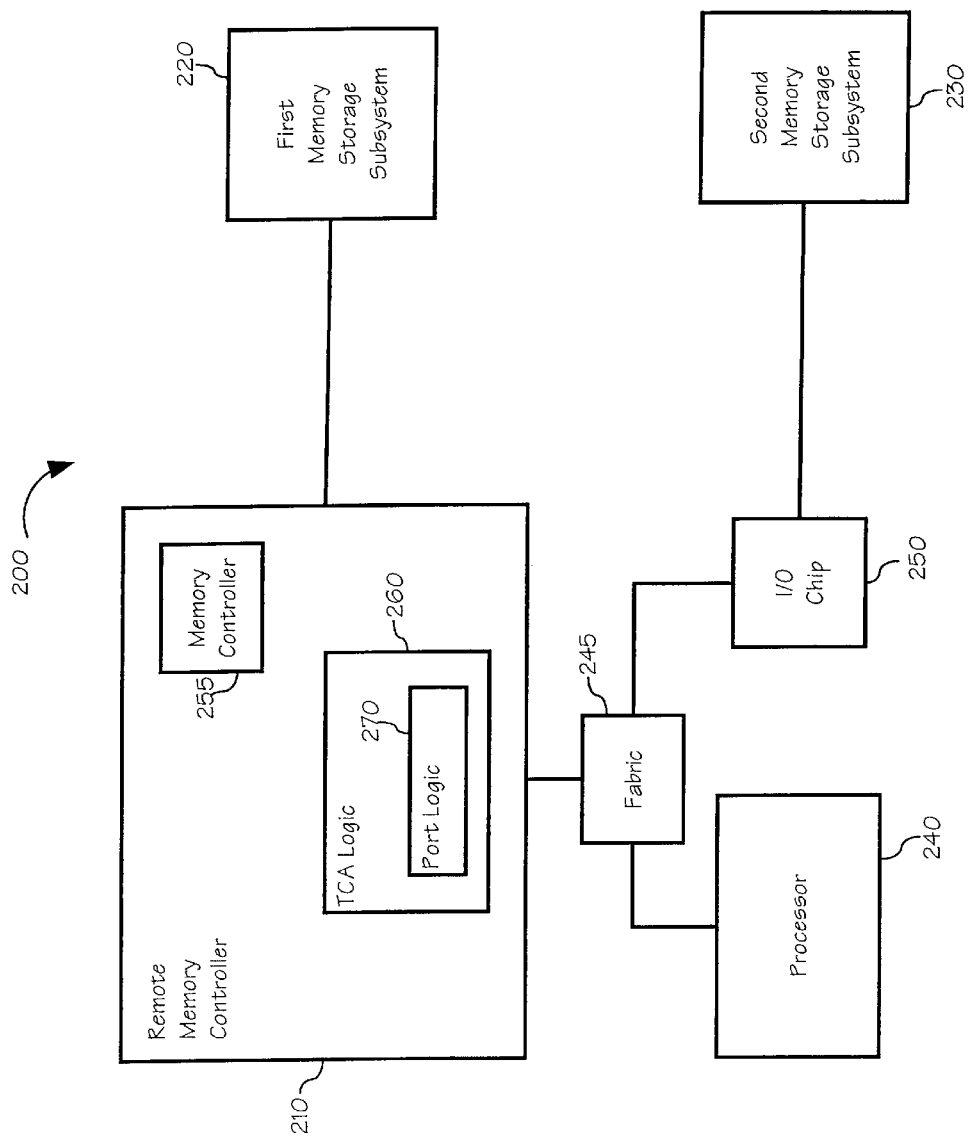
FIG. 2 depicts an embodiment of a storage system which is subject to race conditions known to the art.

Referring now to FIG. 2, an embodiment of a storage system 200 known to the art accompanied by race conditions is shown. In the embodiment as shown in FIG. 2, system 200 is employing the INFINIBAND internal architecture. System 200 may include a remote memory controller 210, a first memory storage subsystem 220, a second memory storage subsystem 230, a processor 240, fabric 245 and IO chip 250. Remote memory controller 210 may include a memory controller 255, a target channel adapter (TCA) logic 260 and port logic 270.

Figure 3:
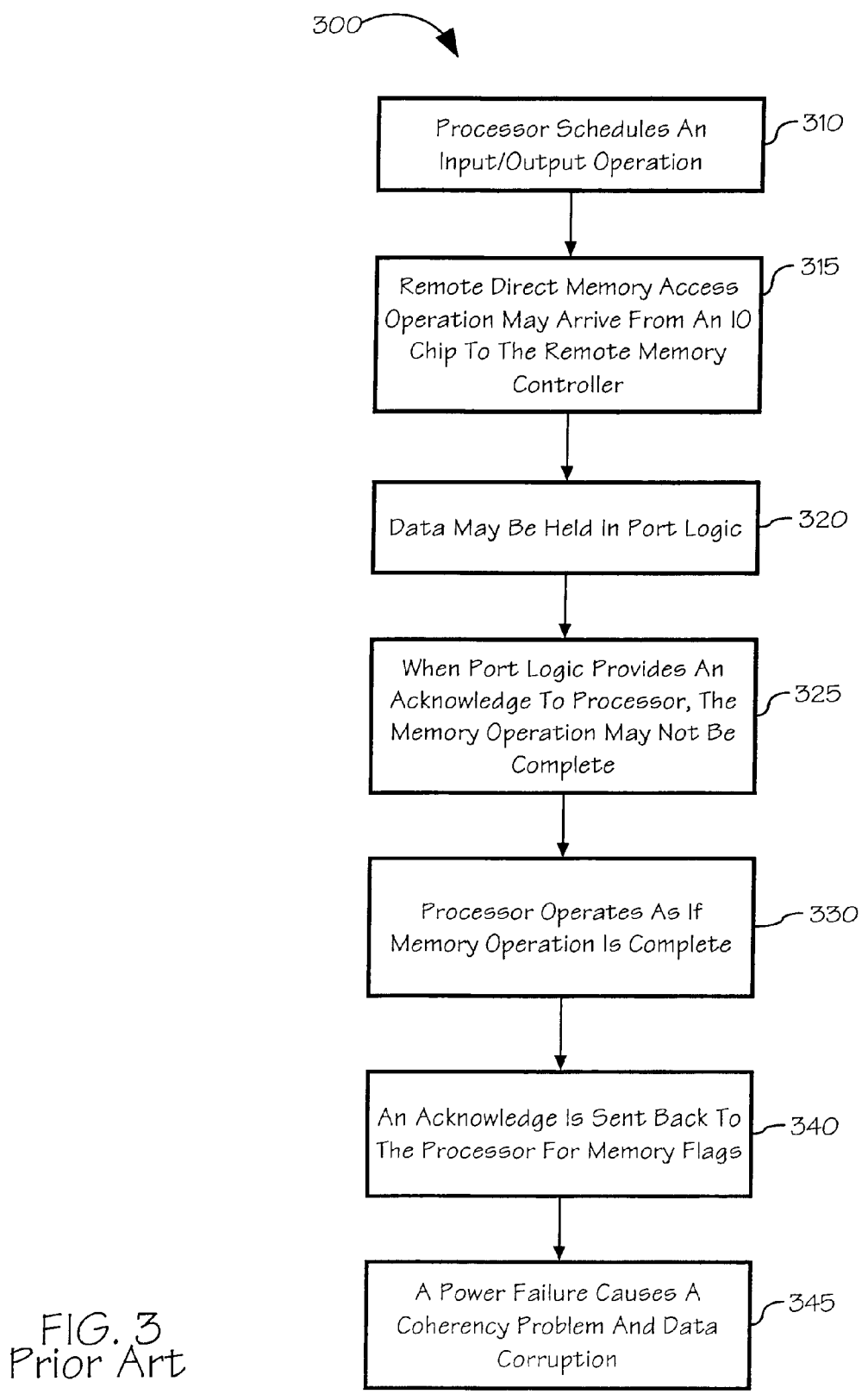
FIG. 3 depicts an embodiment of a process for performing an input/output operation known to the art subject to race conditions.

Referring now to FIG. 3, an embodiment of a process 300 performed by system 200 of FIG. 2 in the execution of an input/output operation is shown. The process begins when a processor schedules an input/output operation 310. The remote direct memory access operation may come in from the IO chip to the remote memory controller 315. Data may be held up in port logic buffers 320. When port logic provides an acknowledge to processor, the memory operation may not be complete 325.

Since processor operates as if memory operation is complete, memory flags may be updated in error 330. Thus, the processor tells the IO chip to transfer data and the IO chip goes through the remote memory controller to obtain the data. Since the data has not been written yet, the remote memory controller accesses bad data in memory. An acknowledge may be sent back to processor for memory flags 340. A power failure may cause a coherency problem and data corruption 345.

Figure 4:
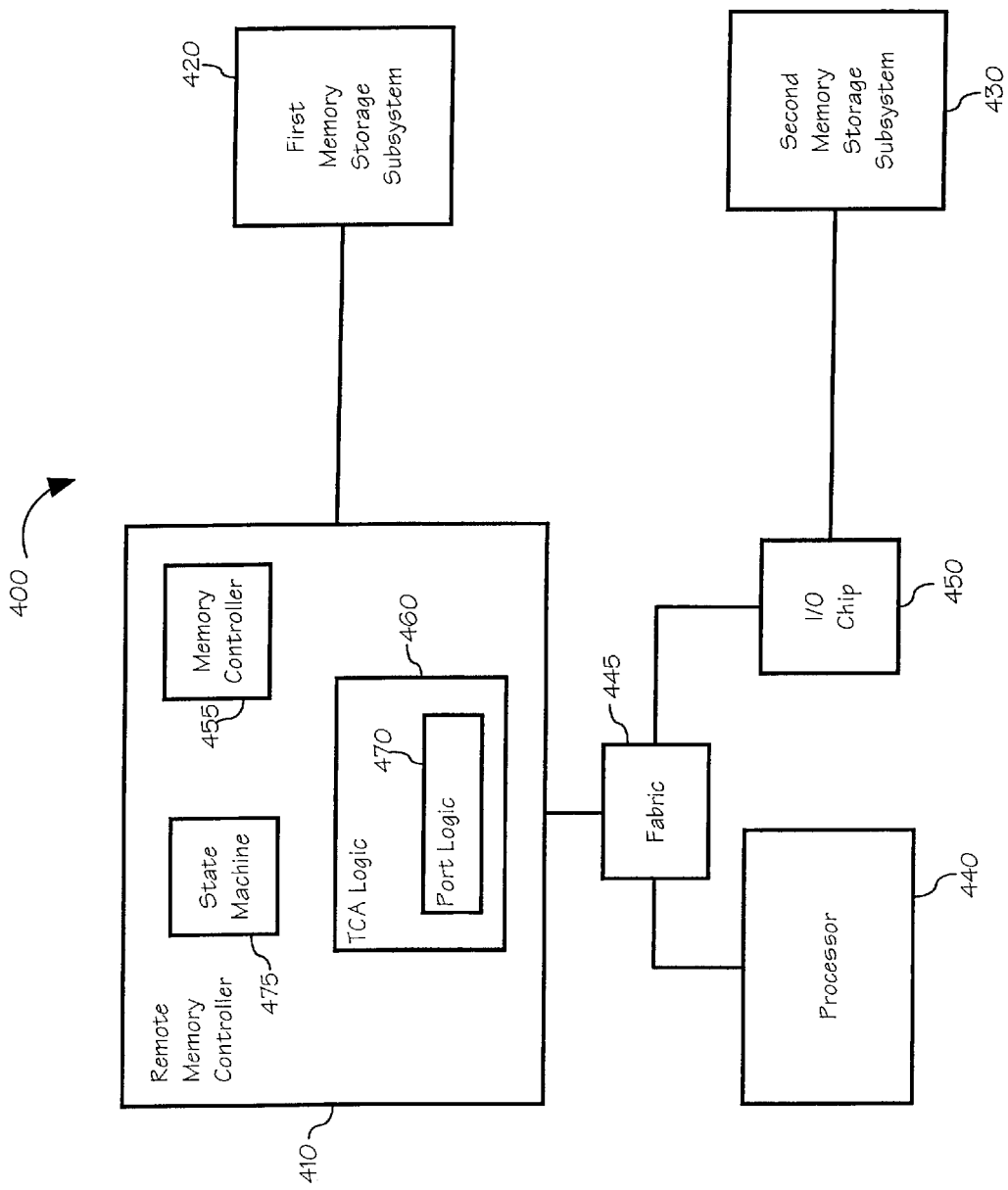
FIG. 4 depicts an embodiment of a storage system of the present invention capable of operating without race conditions.

Referring now to FIG. 4, an embodiment of a storage system 400 of the present invention is shown. In the embodiment shown in FIG. 4, system 400 may employ the INFINIBAND internal architecture. An advantageous aspect of the storage system of the present invention may be the ability to eliminate race conditions. While the INFINIBAND internal architecture is utilized in the embodiment of FIG. 4, the method and system may be utilized on other types of architectures to eliminate race conditions without departing from the scope and spirit of the present invention.

Storage system 400 is substantially similar to the system 200 of FIG. 2 including a remote memory controller 410, a first memory storage subsystem 420, a second memory storage subsystem 430, a processor 440, fabric 445, and IO chip 450. However, remote memory controller 410 of the present invention may include a memory controller 455, a target channel adapter (TCA) logic 460, port logic 470, and a state machine 475.

Another advantageous aspect of data transport with system 400 of the present invention is the ability to return an acknowledgement code to an originating node that the data has been received. When a memory operation has been completed, an acknowledge may be sent and received to alert other components that other operations may proceed. A problem associated with this type of attribute is the creation of race conditions caused by the receipt of an acknowledge when the memory operation has not been completed.

Figure 5:
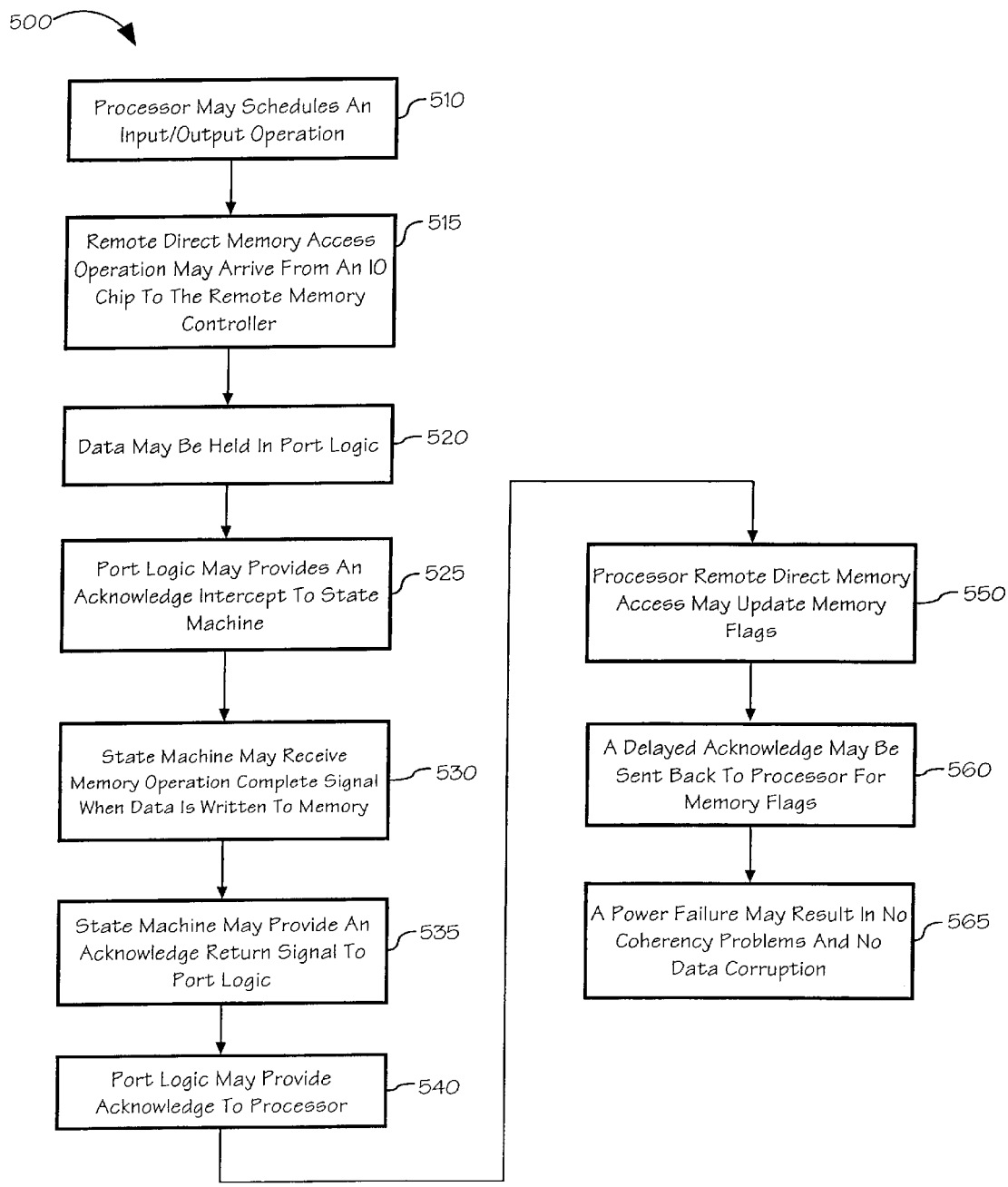
FIG. 5 depicts an embodiment of a process for performing an input/output operation of the present invention which prevents race conditions.

Referring now to FIG. 5, an embodiment of a process 500 performed by system 400 of FIG. 4 is shown. An advantageous aspect of process 500 is the ability to ensure that a memory operation is actually complete before an acknowledge is sent. This may eliminate the race condition of transferring data before the data has been actually written.

The process may begin when processor schedules an input/output operation 510. The remote direct memory access operation may come in from the IO chip to the remote memory controller 515. Data may be held up in port logic buffers 520. At this time, port logic may provide an acknowledge intercept to state machine 525. This may be advantageous as it may provide a means for delaying an acknowledge until a memory operation has been completed.

When data has been written to memory, state machine may receive a memory operation complete signal 530. Upon receipt of a memory operation complete signal, state machine may provide an acknowledge return signal to port logic 535. The acknowledge return signal may alert that port logic may provide an acknowledge to processor 540. Processor remote direct memory access may update memory flags 550. Processor may tell the IO chip to retrieve data, and it is known that that data has been written. A delayed acknowledge may be sent back to processor for memory flags 560. Thus, a power failure may result in no coherency problems and not data corruption 565.

The process described in FIG. 5 is only an embodiment of the invention and changes in the steps and other methods may be utilized to prevent race conditions without departing from the scope and spirit of the present invention. Further, it is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for performing an input/output operation, comprising:
   (a) receiving a memory access request from a first device;
   (b) intercepting an acknowledge signal prior to delivery to a processor;
   (c) verifying said memory access request has been completed; and
   (d) delivering said acknowledge signal to said processor upon completion of said memory access request; wherein data corresponding to said memory access request has been written and is present prior to retrieval.

2. The method as claimed in claim 1 wherein said input/output operation is performed utilizing an INFINIBAND architecture.

3. The method as claimed in claim 1, wherein said intercepting of said acknowledge signal prior to delivery includes:
   (a) transmitting an acknowledge intercept signal to a state machine; and
   (b) receiving a memory access request completion signal by said state machine.

4. The method as claimed in claim 1, wherein verifying said memory access has been completed includes transmitting an acknowledge return signal to port logic.

5. The method as claimed in claim 1, wherein delivering of said acknowledge signal is sent from port logic.

6. A system for performing input/output operation, comprising:
   means for receiving a memory access request from a first device;
   means for intercepting an acknowledge signal prior to delivery to a processor;
   means for verifying said memory access request has been completed; and
   means for delivering said acknowledge signal to said processor upon completion of said memory access request; wherein data corresponding to said memory access request has been written and is present prior to retrieval.

7. The system as claimed in claim 6, wherein said input/output operation is performed utilizing an INFINDBAND architecture.

8. The system as claimed in claim 6 wherein said means for intercepting said acknowledge signal prior to delivery includes:
   (a) means for transmitting an acknowledge intercept signal to a state machine; and
   (b) means for receiving a memory access completion signal by said state machine.

9. The system as claimed in claim 6, wherein said means for verifying said memory access has been completed includes means for transmitting an acknowledge return signal to port logic.

10. The system as claimed in claim 6, wherein said means for delivering of said acknowledge signal is sent from port logic.

11. A method for performing input/output operation, comprising:
    (a) receiving a memory access request from a first device;
    (b) transmitting an acknowledge intercept signal to a state machine;

(c) delivering a memory operation completion signal when data is written to memory;
(d) transmitting an acknowledge return signal to port logic; and
(e) providing an acknowledge signal to a processor; wherein data corresponding to said memory access request has been written and is present prior to retrieval.

12. The method as claimed in claim 11, wherein said input/output operation is performed utilizing an INFINIBAND architecture.

13. The method as claimed in claim 11, wherein said memory operation completed signal is delivered to said state machine.

14. The method as claimed in claim 11, wherein said transmitting of said acknowledge return signal is accomplished by said state machine.

15. The method as claimed in claim 11, wherein port logic provides said acknowledge signal to said processor.

* * * * *